(12) United States Patent
Kuroda

(10) Patent No.: US 11,774,955 B1
(45) Date of Patent: Oct. 3, 2023

(54) INFORMATION PROCESSING APPARATUS, INFORMATION PROCESSING METHOD, AND PROGRAM

(71) Applicant: DAIKIN INDUSTRIES, LTD., Osaka (JP)

(72) Inventor: Kouhei Kuroda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/245,421

(22) PCT Filed: Sep. 21, 2021

(86) PCT No.: PCT/JP2021/034603
§ 371 (c)(1),
(2) Date: Mar. 15, 2023

(87) PCT Pub. No.: WO2022/065309
PCT Pub. Date: Mar. 31, 2022

(30) Foreign Application Priority Data

Sep. 23, 2020 (JP) ................................ 2020-158989

(51) Int. Cl.
*G05B 23/02* (2006.01)
*G06N 5/04* (2023.01)

(52) U.S. Cl.
CPC .......... *G05B 23/0227* (2013.01); *G06N 5/04* (2013.01)

(58) Field of Classification Search
CPC ....... G05B 23/0227; G05B 23/02; G06N 5/04
See application file for complete search history.

(56) References Cited

U.S. PATENT DOCUMENTS

| 5,659,593 | A | 8/1997 | Tzvieli | |
|---|---|---|---|---|
| 7,480,640 | B1 * | 1/2009 | Elad | G06Q 10/10 706/14 |
| 7,536,277 | B2 * | 5/2009 | Pattipatti | G05B 23/0243 702/182 |
| 8,887,286 | B2 * | 11/2014 | Dupont | G06F 21/50 726/25 |
| 8,938,532 | B2 * | 1/2015 | Terrell | H04L 69/22 709/224 |
| 11,025,653 | B2 * | 6/2021 | Faigon | G06F 21/554 |
| 2005/0097364 | A1 * | 5/2005 | Edeki | G06F 21/31 726/4 |

(Continued)

FOREIGN PATENT DOCUMENTS

| CN | 106019138 | 10/2016 |
|---|---|---|
| JP | 2006-163517 | 6/2006 |

(Continued)

OTHER PUBLICATIONS

International Preliminary Report on Patentability for PCT/JP2021/034603 dated Apr. 6, 2023.

(Continued)

*Primary Examiner* — Tung S Lau
(74) *Attorney, Agent, or Firm* — IPUSA, PLLC

(57) ABSTRACT

Provide an information processing apparatus including a determining unit configured to determine whether to generate a learned model that estimates a value relating to a component included in a device, based on at least one of a measurement value measured by each sensor of the device, an anomaly diagnosis result of the device, a result of controlling the device, or a condition relating to the device.

9 Claims, 6 Drawing Sheets

(56) References Cited

U.S. PATENT DOCUMENTS

| | | | |
|---|---|---|---|
| 2010/0229230 A1* | 9/2010 | Edeki | G06F 21/31 |
| | | | 726/28 |
| 2013/0024172 A1 | 1/2013 | Suyama et al. | |
| 2014/0096249 A1* | 4/2014 | Dupont | G06F 21/00 |
| | | | 726/23 |
| 2015/0269293 A1 | 9/2015 | Hatano et al. | |
| 2018/0082207 A1* | 3/2018 | Cormier | G06N 7/046 |
| 2018/0082208 A1* | 3/2018 | Cormier | G06N 5/048 |
| 2018/0259951 A1 | 9/2018 | Tamakoshi et al. | |
| 2018/0351786 A1* | 12/2018 | Pope | H04L 41/0654 |
| 2019/0012553 A1 | 1/2019 | Maruchi et al. | |
| 2019/0171950 A1* | 6/2019 | Srivastava | G06N 5/04 |
| 2019/0188065 A1* | 6/2019 | Anghel | G06F 11/0778 |
| 2020/0125042 A1 | 4/2020 | Oyagi et al. | |
| 2021/0123543 A1 | 4/2021 | Inoue et al. | |
| 2022/0056953 A1 | 2/2022 | Fujimoto et al. | |

FOREIGN PATENT DOCUMENTS

| | | |
|---|---|---|
| JP | 2009-002650 | 1/2009 |
| JP | 5369246 | 12/2013 |
| JP | 2015-179443 | 10/2015 |
| JP | 2018-146448 | 9/2018 |
| JP | 2019-016209 | 1/2019 |
| JP | 2020-067762 | 4/2020 |
| JP | 2020-148329 | 9/2020 |
| WO | 2011/121726 | 10/2011 |
| WO | 2019/235599 | 12/2019 |

OTHER PUBLICATIONS

International Search Report for PCT/JP2021/034603 dated Nov. 22, 2021.

* cited by examiner

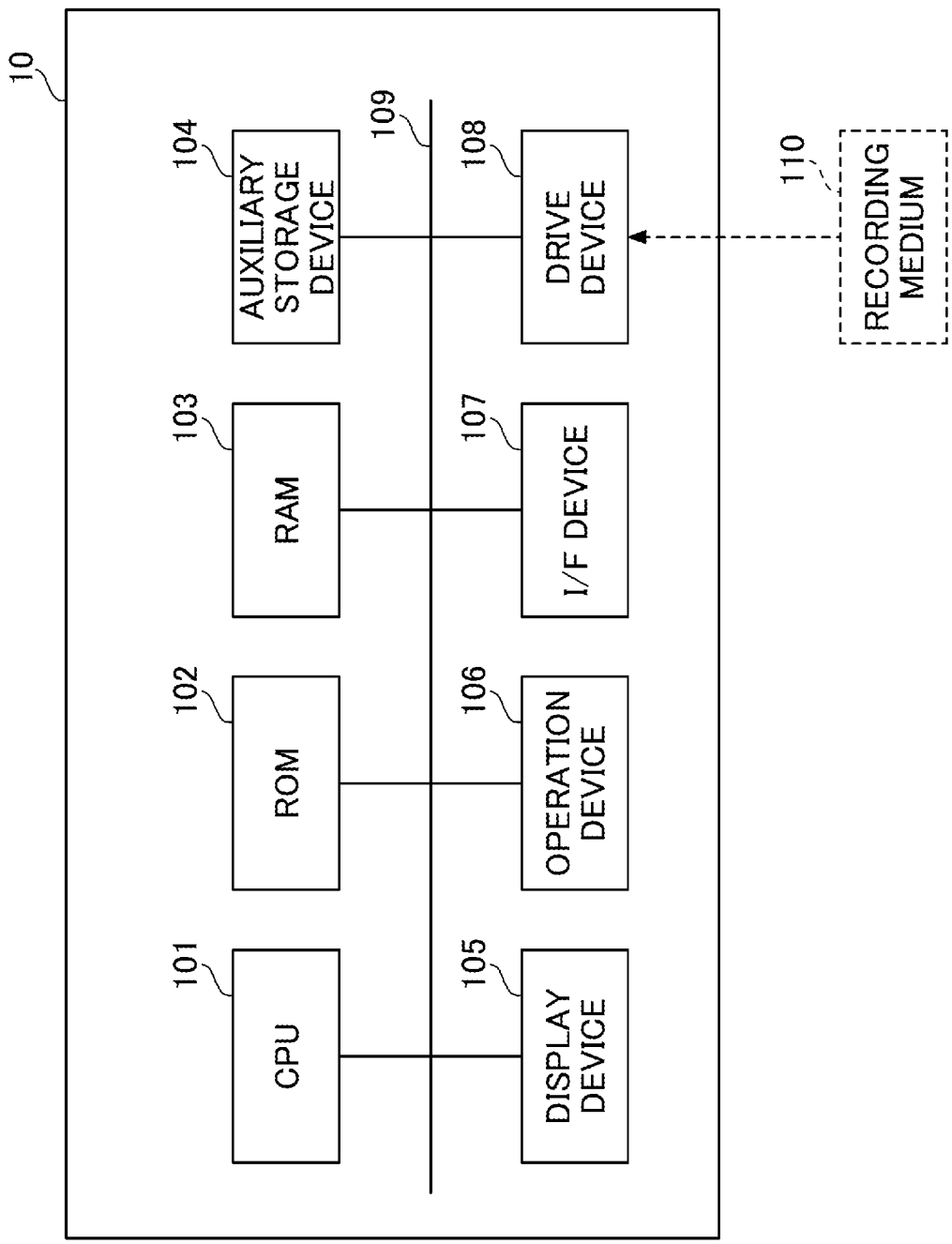

INFORMATION PROCESSING APPARATUS, INFORMATION PROCESSING METHOD, AND PROGRAM

TECHNICAL FIELD

The present disclosure relates to an information processing apparatus, an information processing method, and a program.

BACKGROUND ART

Conventionally, in order to diagnose an anomaly (malfunction, failure, deterioration) in a component or the like of a device, a technology for generating a learned model that performs a diagnosis unique to the device based on the data of the device has been known (see, e.g., Patent Document 1).

CITATION LIST

Patent Documents

[Patent Document 1]
Japanese Unexamined Patent Application Publication No. 2018-146448

SUMMARY OF INVENTION

Technical Problem

However, in order to generate a learned model for each device, processing costs, etc., will arise. The purpose of the present disclosure is to provide a technology that enables appropriate determination of anomaly of a device.

Solution to Problem

An information processing apparatus according to a first aspect of the present disclosure includes a determining unit configured to determine whether to generate a learned model that estimates a value relating to a component included in a device, based on at least one of a measurement value measured by each sensor of the device, an anomaly diagnosis result of the device, a result of controlling the device, or a condition relating to the device. Accordingly, anomaly determination of the device can be appropriately performed.

Further, a second aspect of the present disclosure is the information processing apparatus according to the first aspect, further including an estimating unit configured to estimate the value relating to the component by a predetermined estimation method, based on at least one of the measurement value measured by each sensor of the device, the anomaly diagnosis result of the device, or the result of controlling the device, wherein the determining unit determines to generate the learned model, when an error between the value estimated by the estimating unit and an actual measurement value of the value relating to the component is greater than or equal to a threshold.

Further, a third aspect of the present disclosure is the information processing apparatus according to the first or second aspect, wherein the determining unit determines to generate the learned model, when at least one of an environment in which the device is used determined based on the measurement value measured by each sensor of the device, information of a property where the device is installed, or a machine type of the device, satisfies a predetermined condition.

Further, a fourth aspect of the present disclosure is the information processing apparatus according to any one of the first to third aspects, further including an anomaly determining unit configured to determine that the component has an anomaly, when the determining unit determines not to generate the learned model and an error between an estimation value and an actual measurement value of the value relating to the component is greater than or equal to a first threshold, and determine that the component has an anomaly, when the determining unit determines to generate the learned model and an error between an estimation value and an actual measurement value of the value relating to the component is greater than or equal to a second threshold that is greater than the first threshold.

Further, a fifth aspect of the present disclosure is the information processing apparatus according to any one of the first to fourth aspects, further including a generating unit configured to generate the learned model based on a data set when the component is normal, in which at least one of the measurement value measured by each sensor of the device, the anomaly diagnosis result of the device, or the result of controlling the device is an explanatory variable, and an actual measurement value of the value relating the component is a correct answer label.

Further, a sixth aspect of the present disclosure is the information processing apparatus according to any one of the first to fifth aspects, wherein the determining unit determines an estimation method of estimating the value relating to the component for detecting an anomaly of the component, from among a predetermined estimation method and an estimation method using the learned model, based on a first error between a first estimation value of the value relating to the component estimated by the predetermined estimation method and an actual measurement value, and a second error between a second estimation value of the value relating to the component estimated by the learned model and an actual measurement value.

Further, a seventh aspect of the present disclosure is the information processing apparatus according to any one of the first to fourth aspects, wherein the value relating to the component includes at least one of an outside air temperature, an intake tube temperature, a discharge tube temperature, a heat exchange temperature, a supercooling heat exchange outlet temperature, a receiver liquid tube temperature, an accumulator inlet temperature, a high pressure, a low pressure, an inverter current value, an inverter rotational speed, or an electromagnetic valve opening degree of an outdoor motor.

Further, an information processing method according to an eighth aspect of the present disclosure causes an information processing apparatus to execute a process of determining whether to generate a learned model that estimates a value relating to a component included in a device, based on at least one of a measurement value measured by each sensor of the device, an anomaly diagnosis result of the device, a result of controlling the device, or a condition relating to the device.

Further, a program according to a ninth aspect of the present disclosure causes an information processing apparatus to execute a process of determining whether to generate a learned model that estimates a value relating to a component included in a device, based on at least one of a measurement value measured by each sensor of the device, an anomaly diagnosis result of the device, a result of controlling the device, or a condition relating to the device.

BRIEF DESCRIPTION OF DRAWINGS

FIG. 2 illustrates an example of the hardware configuration of the information processing apparatus according to the embodiment.

DESCRIPTION OF EMBODIMENTS

Each embodiment will be described below with reference to the drawings. In this specification and the drawings, with respect to elements having substantially the same functional configuration, duplicate descriptions are omitted by assigning identical symbols.

<System Configuration>

Figure 1:
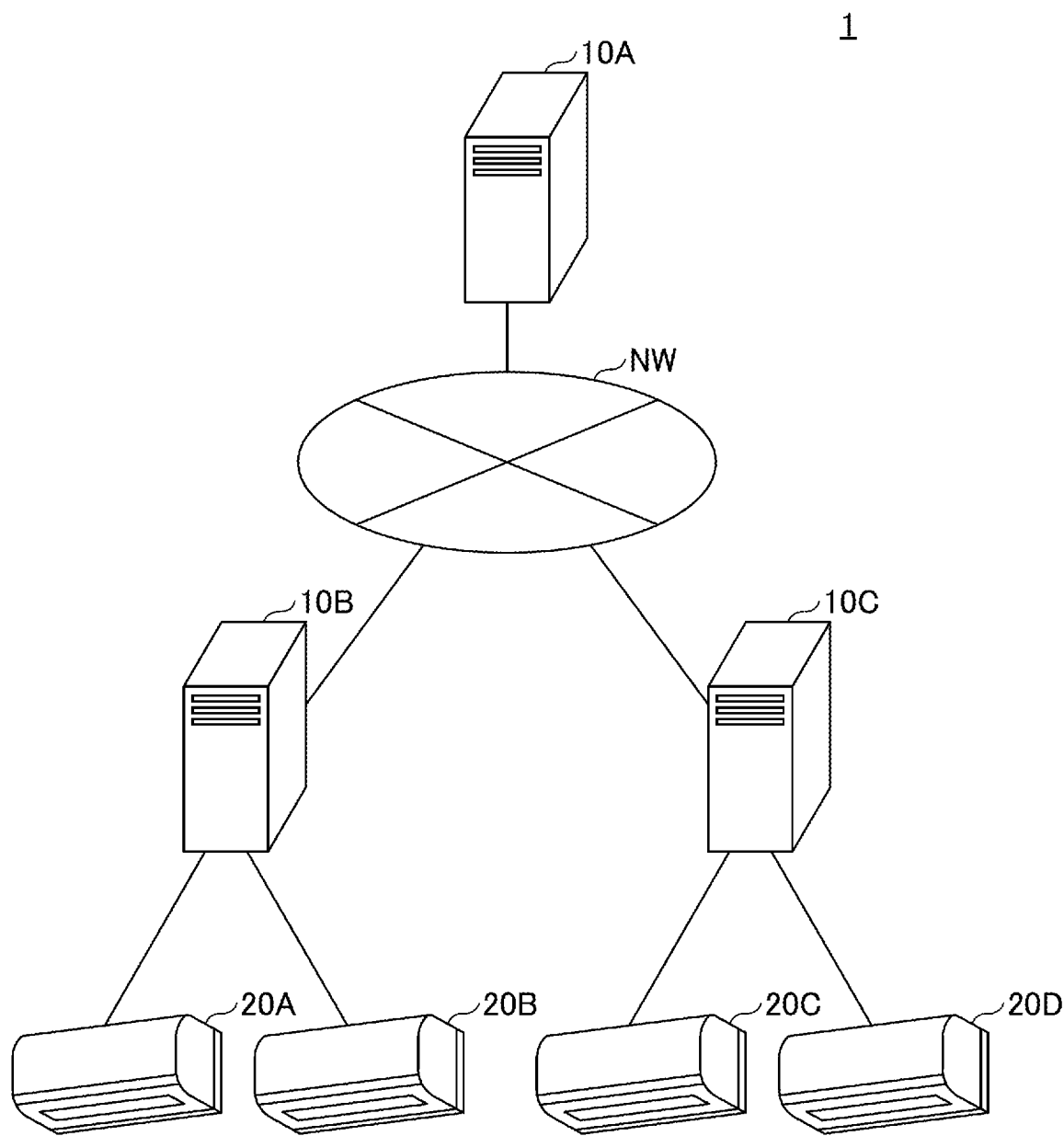
FIG. 1 illustrates an example of the system configuration of the information processing system according to the embodiment.

First, the system configuration of an information processing system 1 will be described. FIG. 1 illustrates an example of the system configuration of the information processing system 1 according to the embodiment. As illustrated in FIG. 1, the information processing system 1 includes an information processing apparatus 10A, an information processing apparatus 10B, and an information processing apparatus 10C (hereafter, when it is not necessary to distinguish each of these from each other, simply referred to as "the information processing apparatus 10"). The information processing system 1 also includes a device 20A, a device 20B, a device 20C, and a device 20D (hereafter, when it is not necessary to distinguish each of these from each other, simply referred to as the "device 20"). The numbers of the information processing apparatuses 10 and the devices 20 are not limited to the example in FIG. 1.

The information processing apparatus 10 and the device 20 may be connected so as to be able to communicate via, for example, a network NW such as the Internet, a wireless LAN (Local Area Network), a LAN, a mobile phone network such as LTE (Long Term Evolution) and 5G, a signal line, or the like. The device 20 may be installed in, for example, a residence, an office, a public facility, or the like. The information processing apparatus 10 may be, for example, a server on a cloud. Further, the information processing apparatus 10 may be, for example, an edge server installed in a building where multiple devices 20 are installed. Further, the information processing apparatus 10 may be housed in, for example, the device 20 (for example, the indoor housing of an air conditioner). The information processing apparatus 10A, the information processing apparatus 10B and the information processing apparatus 10C may be the same apparatus.

The device 20 may be, for example, a variety of devices such as air conditioners, refrigerators, water heaters, lighting, and the like, and may have an Internet of Things (IoT) device that transmits various kinds of measured information to the information processing apparatus 10.

<Hardware Configuration>
<<Hardware Configuration of the Information Processing Apparatus 10>>

Next, the hardware configuration of the information processing apparatus 10 according to the embodiment will be described. FIG. 2 illustrates an example of the hardware configuration of the information processing apparatus 10 according to the embodiment. As illustrated in FIG. 2, the information processing apparatus 10 includes a CPU (Central Processing Unit) 101, a ROM (Read Only Memory) 102, and a RAM (Random Access Memory) 103. The CPU 101, the ROM 102, and the RAM 103 form what is referred to as a computer. Further, the information processing apparatus 10 includes an auxiliary storage device 104, a display device 105, an operation device 106, an I/F (Interface) device 107, and a drive device 108. The pieces of hardware of the information processing apparatus 10 are connected to each other via a bus 109.

The CPU 101 is an arithmetic device that executes various programs (e.g., machine learning programs, etc.) installed in the auxiliary storage device 104. The ROM 102 is a non-volatile memory. The ROM 102 functions as a main storage device and stores various programs, data, etc., necessary for the CPU 101 to execute various programs installed in the auxiliary storage device 104. Specifically, the ROM 102 stores boot programs, such as BIOS (Basic Input/Output System) and EFI (Extensible Firmware Interface).

The RAM 103 is a volatile memory, such as DRAM (Dynamic Random Access Memory) and SRAM (Static Random Access Memory). The RAM 103 functions as a main storage device and provides a work area that is expanded when various programs installed in the auxiliary storage device 104 are executed by the CPU 101.

The auxiliary storage device 104 stores various programs and information used when various programs are executed.

The display device 105 is a display device for displaying various kinds of information. The operation device 106 is an operation device for receiving various operations. The I/F device 107 is a communication device that communicates with external devices.

The drive device 108 is a device for setting the recording medium 110. The recording medium 110 here includes media for recording information optically, electrically or magnetically, such as a CD-ROM, a flexible disk, a magneto-optical disk, etc. Further, the recording medium 110 may include a semiconductor memory, etc., for electrically recording information, such as ROM, flash memory, etc.

Various programs installed in the auxiliary storage device 104 are installed, for example, when the distributed recording medium 110 is set in the drive device 108 and various programs recorded in the recording medium 110 are read by the drive device 108. Alternatively, various programs installed in the auxiliary storage device 104 may be installed by being downloaded from a network (not illustrated).

<<Configuration of the Device 20>>

Next, the configuration of the device 20 according to the embodiment will be described. An example in which the device 20 is an air conditioner will be described below.

Figure 3A:
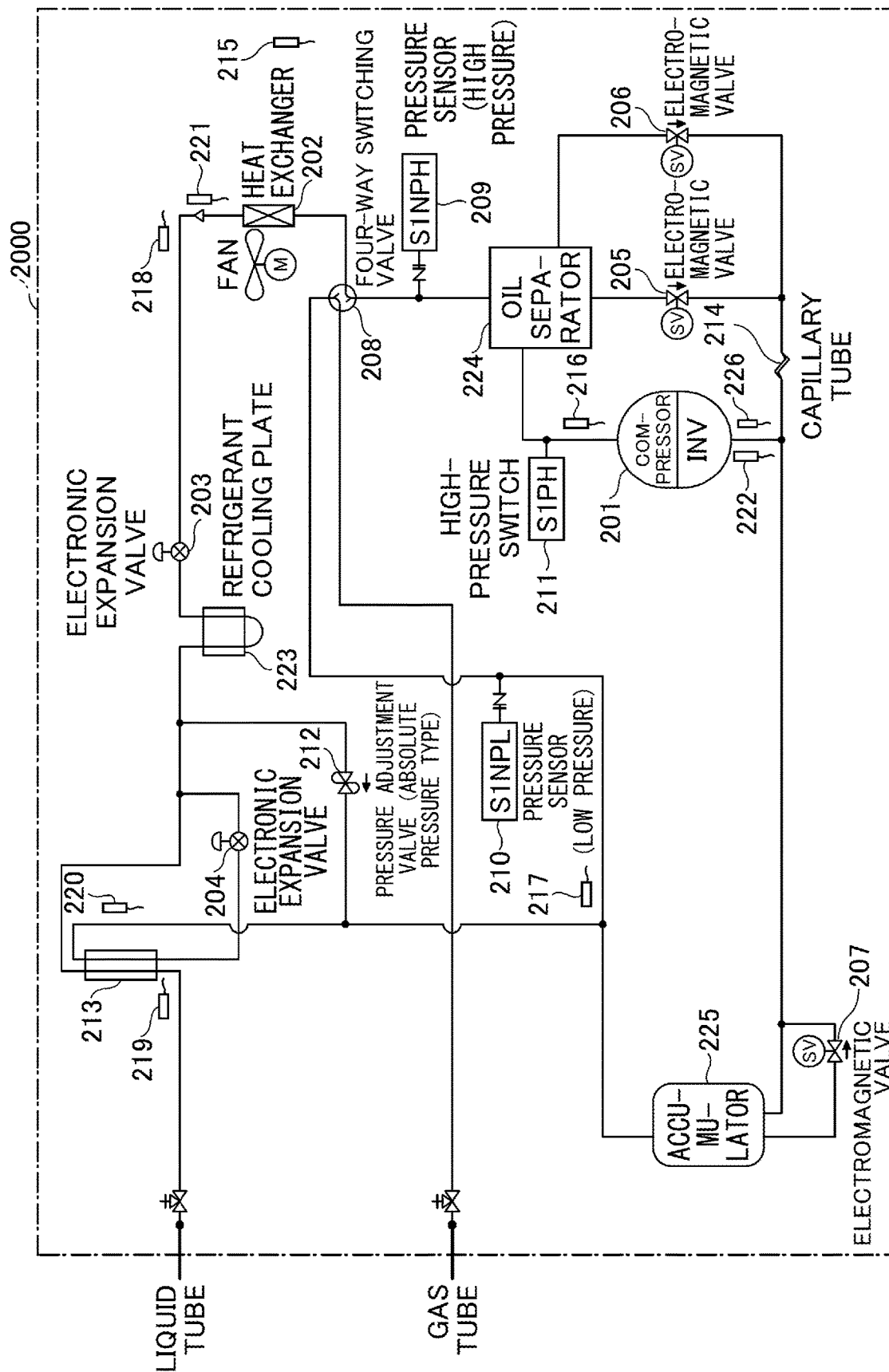
FIG. 3A illustrates an example of the configuration of an outdoor unit of the device according to the embodiment.
Figure 3B:
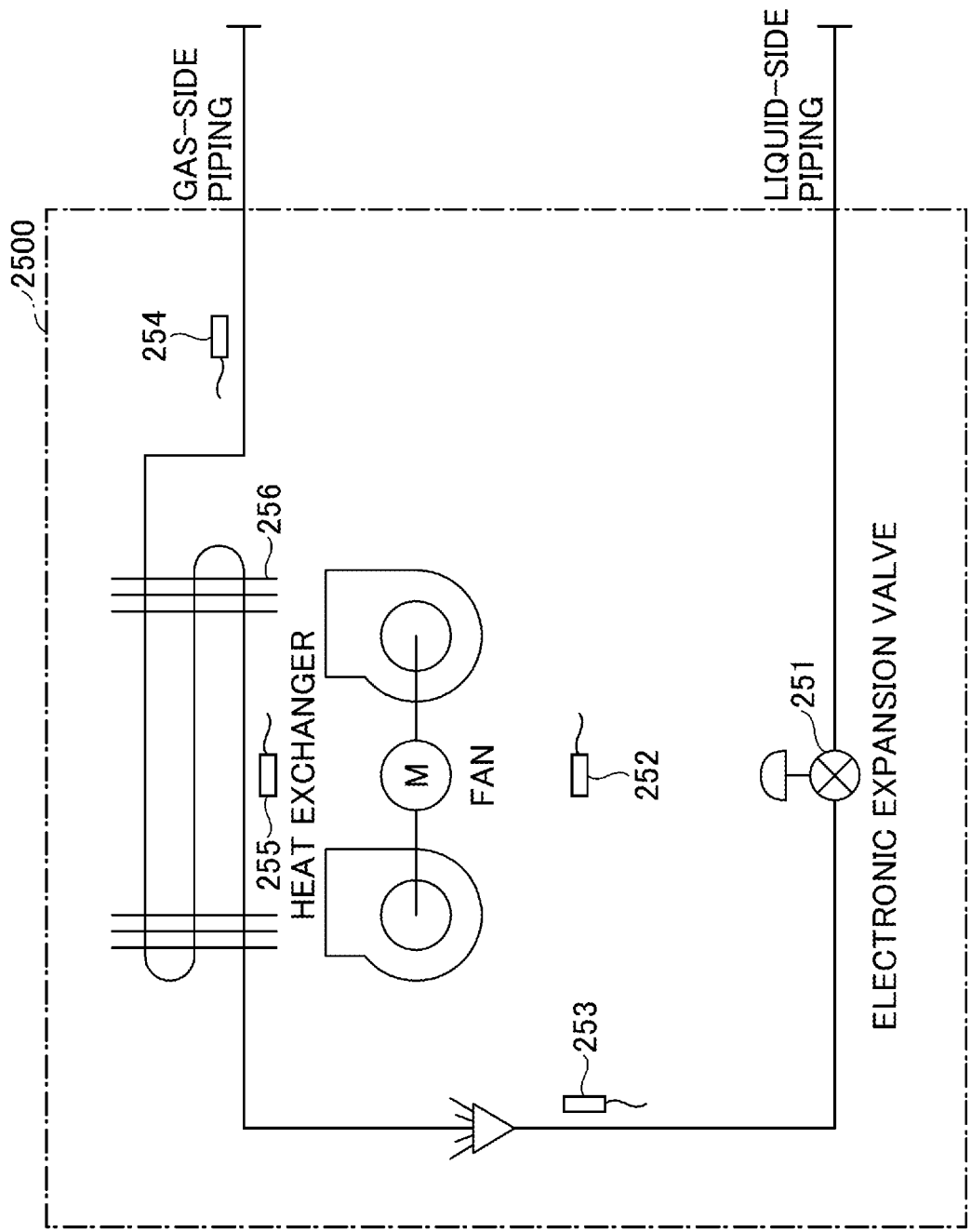
FIG. 3B illustrates an example of the configuration of an indoor unit of the device according to the embodiment.

FIG. 3A illustrates an example of the configuration of an outdoor unit 2000 of the device 20 according to the embodiment. FIG. 3B illustrates an example of the configuration of an indoor unit 2500 of the device 20 according to the embodiment.

The device 20, which is an air conditioner, includes a control device 40 that controls each unit of the device 20. The control device 40 may be built into, for example, the outdoor unit 2000 or the indoor unit 2500 of the device 20.

The control device 40 of the device 20 may be implemented by a microcontroller in which the CPU, a memory, and an input/output unit are built into one integrated circuit. Further, the control device 40 of the device 20 may be implemented by a circuit such as an ASIC (Application Specific Integrated Circuit), a DSP (digital signal processor), an FPGA (field programmable gate array), or the like. Further, the control device 40 of the device 20 may be implemented by the computer illustrated in FIG. 2 above.

Further, the device 20 is equipped with various devices configuring a refrigerant circuit and various sensors. Each device configuring the refrigerant circuit is controlled by the control device 40. The refrigerant circuit is, for example, a closed circuit filled with a refrigerant such as chlorofluorocarbon. The refrigerant circuit may be configured, for example, such that the refrigerant circulates to perform a vapor compression type refrigeration cycle.

(Configuration of the Outdoor Unit 2000 of the Device 20)

In the example illustrated in FIG. 3A, the outdoor unit 2000 of the device 20 includes a compressor 201, an outdoor heat exchanger 202, an electronic expansion valve 203, an electronic expansion valve 204, an electromagnetic valve 205 (oil separator oil return), an electromagnetic valve 206 (oil separator bypass), an electromagnetic valve 207 (accumulator oil return), a four-way switching valve 208, a high-pressure sensor 209, a low-pressure sensor 210, a high-pressure switch 211, a pressure adjustment valve 212, a supercooling heat exchanger 213, a capillary tube 214, a thermistor 215, a thermistor 216, a thermistor 217, a thermistor 218, a thermistor 219, a thermistor 220, a thermistor 221, a thermistor 222, a refrigerant cooling plate 223, etc.

The compressor 201 compresses and discharges the taken in refrigerant. For example, by changing the rotational speed of the motor (rotational speed of the compressor 201) by changing the frequency of the alternating current supplied from the inverter of the compressor 201 to the motor (not illustrated), the capacity of the compressor 201 can be changed. The rotational speed may be, for example, the number of rotations per unit time.

In the outdoor heat exchanger 202 (air heat exchanger), the outdoor air taken in by the outdoor fan and the refrigerant exchange heat. The opening (hole size) of the electronic expansion valve 203 (main) and the electronic expansion valve 204 (injection) is adjusted, for example, by the valve element being driven by a pulse motor. The electronic expansion valve 203 is controlled so that the outlet overheat of the outdoor heat exchanger becomes constant during a heating operation. The electronic expansion valve 204 is controlled so that the outlet overheat of the supercooling heat exchanger 213 becomes constant.

The electromagnetic valve 205 (oil separator oil return) and the electromagnetic valve 206 (oil separator bypass) control the amount of oil returned from an oil separator 224 to the compressor 201. The electromagnetic valve 207 (accumulator oil return) is used to return oil from an accumulator 225 to the compressor 201. The four-way switching valve 208 switches between cooling and heating operations.

The high pressure sensor 209 is a sensor that detects high pressure. The high pressure is the high pressure in the refrigeration cycle of the device 20 (hereafter, also referred to simply as "high pressure" as appropriate), and may be, for example, the pressure of the refrigerant compressed and discharged by the compressor 201 (the discharge pressure of the compressor 201) or the pressure of the refrigerant in a condenser.

The low pressure sensor 210 is a sensor that detects low pressure. The low pressure is the low pressure in the refrigeration cycle of the device 20 (hereafter, also referred to simply as "low pressure" as appropriate), and may be, for example, the pressure of the refrigerant taken into the compressor 201 (the pressure of the refrigerant before being compressed into the compressor 201).

The high pressure switch 211 stops the operation of the device 20 when the pressure is above a predetermined pressure in order to avoid the increase of the high pressure when the compressor 201 has an anomaly.

The pressure adjustment valve 212 opens the liquid tube when the pressure is above the predetermined pressure to avoid the increase of the high pressure in order to prevent the breakage of the functional components due to the increase of the pressure during transportation and storage.

The supercooling heat exchanger 213 supercools the liquid refrigerant.

The capillary tube 214 returns the refrigerating machine oil separated by the oil separator 224 to the compressor 201.

The thermistor 215 is a sensor (temperature sensor) that detects (measures) the outside air temperature. The outside air temperature measured by the thermistor 215 may be used, for example, to correct the discharge tube temperature.

The thermistor 216 is a sensor that detects the discharge tube temperature indicating the temperature of the refrigerant discharged from the compressor 201. The discharge tube temperature measured by the thermistor 216 may be used, for example, for temperature protection control, etc., of the compressor 201.

The thermistor 217 is a sensor for detecting the gas tube temperature at the inlet of the accumulator 225. The gas tube temperature measured by the thermistor 217 may be used, for example, for control to keep the intake superheating level constant during heating. The thermistor 218 is a sensor for detecting the liquid tube temperature of the outdoor heat exchanger 202. The liquid tube temperature measured by the thermistor 218 may be used, for example, for overfill determination, etc., during test operation. The thermistor 219 is a sensor for detecting the liquid tube temperature of the supercooling heat exchanger 213. The thermistor 220 is a sensor for detecting the evaporation-side gas tube temperature of the supercooling heat exchanger 213. The evaporation-side gas tube temperature measured by the thermistor 219 may be used, for example, to control the overheat at the outlet of the supercooling heat exchanger 213 to a constant value, etc.

The thermistor 221 is a sensor that detects the liquid tube temperature of the outdoor heat exchanger 202. The liquid tube temperature measured by the thermistor 221 may be used, for example, to determine a defrost operation. The thermistor 222 is a sensor that detects the surface temperature of the compressor 201. The control device 40 may stop the operation of the device 20 when the surface temperature exceeds the threshold value in order to avoid the temperature of the compressor 201 rising in the event of an anomaly. The thermistor 226 is a sensor that detects the inlet tube temperature indicating the temperature of the refrigerant taken into the compressor 201. The refrigerant cooling plate 223 is a cooling plate for cooling the refrigerant liquid.

The accumulator 225 is, for example, a device that separates the liquid and gas of the refrigerant taken into the compressor 201, and allows only the gas to be taken into the compressor 201. The outdoor unit 2000 may have a receiver (refrigerant quantity adjustment container) in place of or in addition to the accumulator 225. The receiver is a container for temporarily storing the refrigerant liquid condensed by the condenser. The receiver can temporarily store the refrigerant liquid when, for example, the amount of refrigerant in the evaporator changes due to variations in air conditioning load.

(Configuration of the Indoor Unit 2500 of the Device 20)

In the example of FIG. 3B, the indoor unit 2500 (indoor unit) of the device 20 includes an electronic expansion valve 251, a thermistor 252, a thermistor 253, a thermistor 254, a thermistor 255, an indoor heat exchanger 256, etc.

The electronic expansion valve 251 may be used for gas superheating control during a cooling operation and for supercooling control during a heating operation. The thermistor 252 is a sensor that detects the temperature (indoor temperature) of air taken in by the fan of the indoor heat exchanger 256. The thermistor 253 is a sensor that detects the liquid tube temperature between the electronic expansion valve 251 and the indoor heat exchanger 256. The liquid tube temperature measured by the thermistor 253 may be used, for example, for gas superheating control during a cooling operation, for supercooling control during a heating operation, etc.

The thermistor 254 is a sensor that detects the gas tube temperature between the indoor heat exchanger 256 and the gas-side piping to the outdoor unit 2000. The gas tube temperature measured by the thermistor 254 may be used, for example, to control the degree of gas superheating during a cooling operation. The thermistor 255 is a sensor that detects the temperature of air blown out of the indoor heat exchanger 256.

In the indoor heat exchanger 256, the refrigerant exchanges heat with the indoor air taken in by the indoor fan. The indoor fan may be, for example, a cylindrical fan (cross-flow fan) that takes in air through the inlet and discharges air through the outlet by rotating an impeller tilted forward in the direction of rotation. With the rotation of the indoor fan, the indoor air is taken into the indoor unit, and air adjusted in temperature or the like is discharged into the room.

During the cooling operation, the four-way switching valve 208 is set to the first state. When the compressor 201 is operated in this state, the outdoor heat exchanger 202 becomes a condenser (radiator) and the indoor heat exchanger 256 becomes an evaporator to perform the refrigeration cycle. In this case, the refrigerant discharged from the compressor 201 flows to the outdoor heat exchanger 202 and radiates heat to the outdoor air. The refrigerant that has radiated heat then expands (upon being decompressed) when passing through the electronic expansion valve 251 of the indoor unit 2500 and flows to the indoor heat exchanger 256. In the indoor heat exchanger 256, the refrigerant absorbs heat from the indoor air and evaporates, and the cooled indoor air is supplied to the room. The evaporated refrigerant is taken into the compressor 201 and compressed.

During the heating operation, the four-way switching valve 208 is set to the second state. When the compressor 201 is operated in this state, the indoor heat exchanger 256 becomes a condenser (radiator) and the outdoor heat exchanger 202 becomes an evaporator, and the refrigeration cycle is performed. In this case, the refrigerant discharged from the compressor 201 flows to the indoor heat exchanger 256 and radiates heat to the indoor air. This supplies heated indoor air into the room. The refrigerant that has radiated heat expands (upon being decompressed) as the refrigerant passes through the electronic expansion valve 203. The refrigerant expanded by the electronic expansion valve 203 flows to the outdoor heat exchanger 202, absorbs heat from the outdoor air, and evaporates. The evaporated refrigerant is taken into the compressor 201 and is compressed.

<Functional Configuration>

Figure 4:
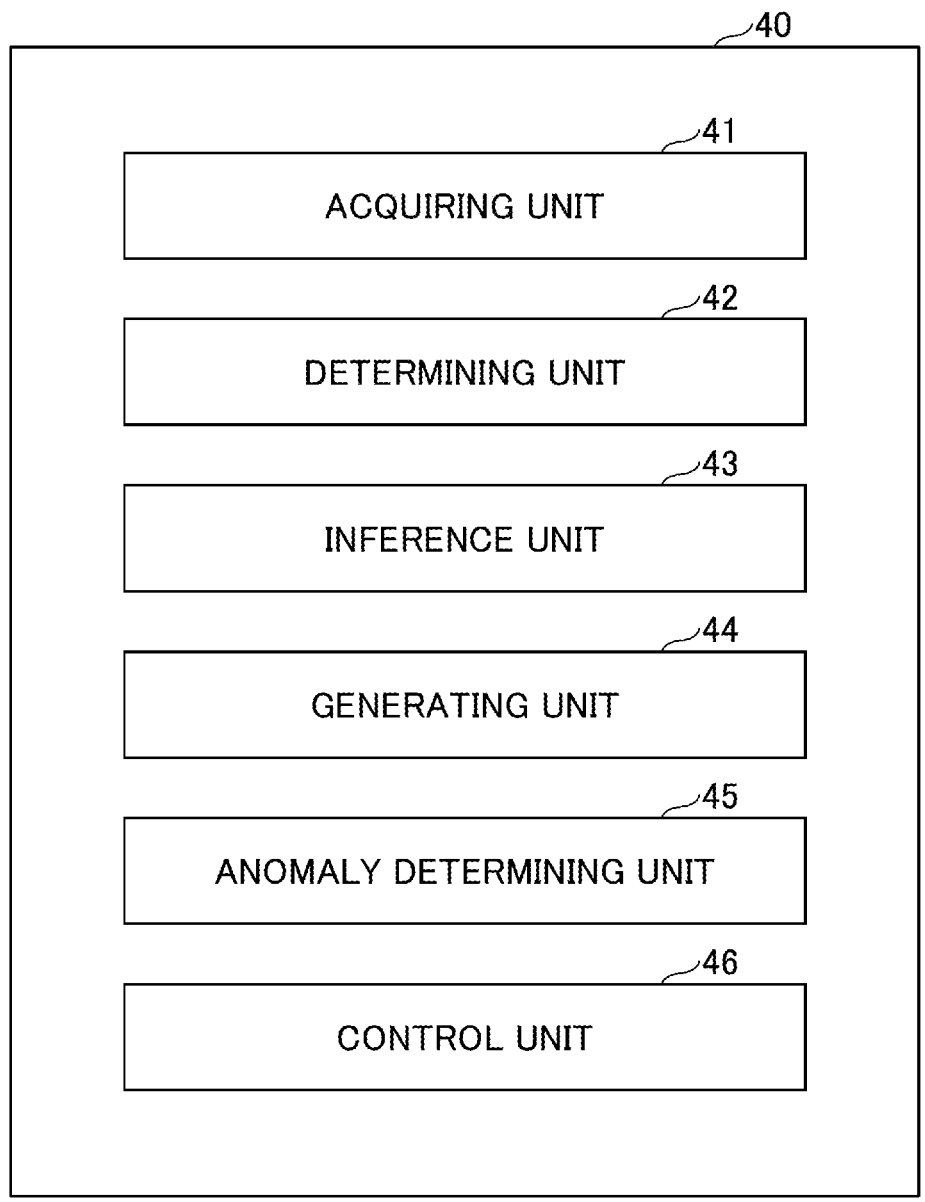
FIG. 4 illustrates an example of the functional configuration of a control device of the device according to the embodiment.

Next, referring to FIG. 4, the functional configuration of the control device 40 of the device 20 according to the embodiment will be described. FIG. 4 is a diagram illustrating an example of the functional configuration of the control device 40 of the device 20 according to the embodiment.

The control device 40 of the device 20 includes an acquiring unit 41, a determining unit 42, an inference unit 43, a generating unit 44, an anomaly determining unit 45, and a control unit 46. These units may be implemented by the cooperation of, for example, one or more programs installed in the device 20 and the CPU or the like of the device 20.

The acquiring unit 41 acquires various kinds of data. The acquiring unit 41 acquires, for example, actual measurement values of values relating to components included in the device 20 from various sensors of the device 20.

The determining unit 42 performs various determinations. The determining unit 42 determines, for example, whether to generate a learned model that estimates a value relating to a component included in the device 20.

The inference unit 43 calculates an estimation value of a value relating to a component included in the device 20 based on a predetermined estimation method that is set in advance (hereinafter also referred to as the "default inference model" as appropriate), or a learned model specific (unique) to the device 20 generated by the generating unit 44.

When it is determined by the determining unit 42 that a learned model is to be generated to estimate a value relating to a component included in the device 20, the generating unit 44 generates the learned model by performing machine learning based on the data of the device 20.

The anomaly determining unit 45 detects an anomaly in a component based on the actual measurement value of the value relating to the component included in the device 20 acquired by the acquiring unit 41 and the estimation value of the value relating to the component calculated by the inference unit 43. The control unit 46 controls each unit of the device 20.

<Processing>

Figure 5:
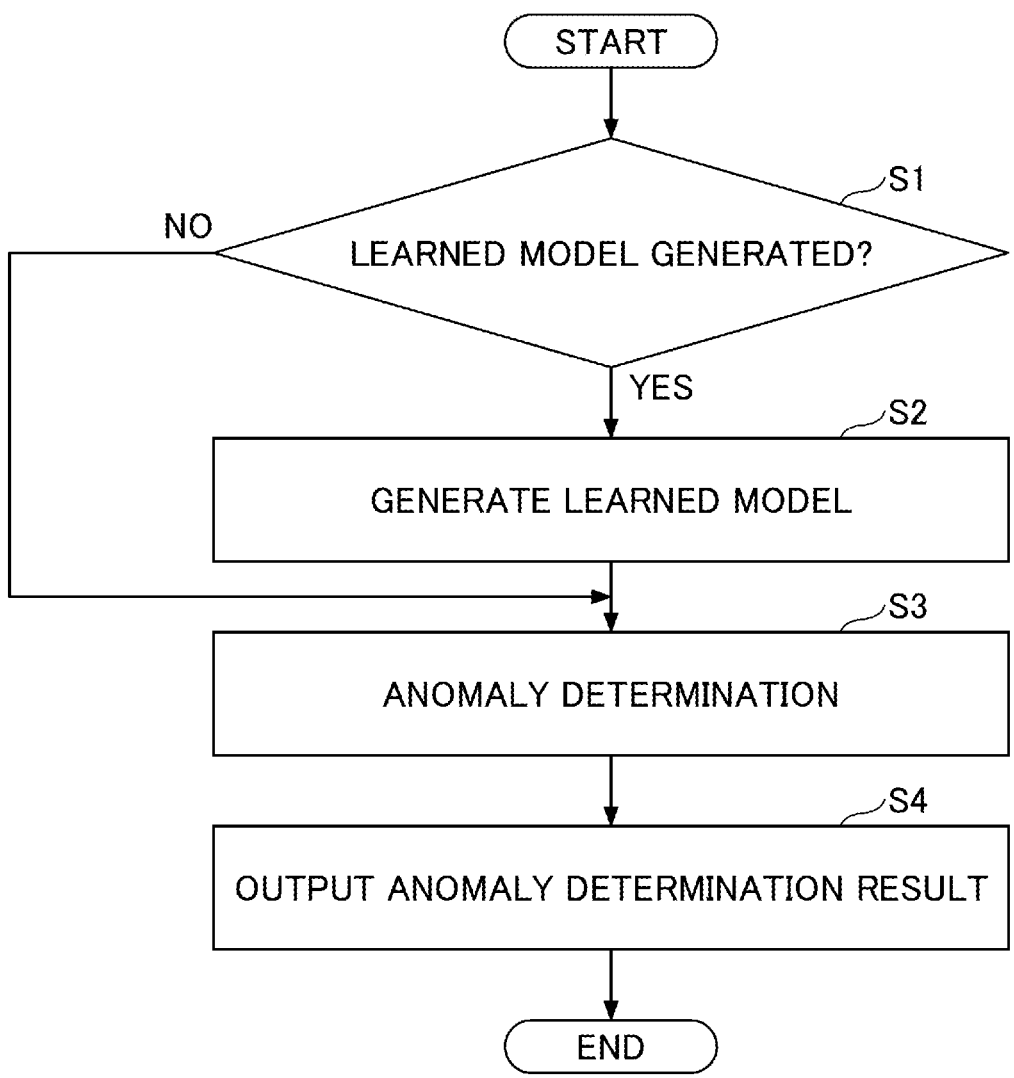
FIG. 5 is a flowchart illustrating an example of the processing of the control device of the device according to the embodiment.

An example of processing of the control device 40 of the device 20 according to the embodiment will be described with reference to FIG. 5. FIG. 5 is a flow chart illustrating an example of processing of the control device 40 of the device 20 according to the embodiment.

In step S1, the determining unit 42 determines whether to generate a learned model that estimates values relating to the components included in the device 20. The values relating to the components included in the device 20 may include, for example, measurement values measured by each of the sensors of the device 20. In this case, the values relating to the components included in the device 20 may include, for example, at least one of the following: the outside air temperature, the inlet tube temperature, the discharge tube temperature, the heat exchanger temperature, the supercooling heat exchange outlet temperature, the receiver liquid tube temperature, the accumulator inlet temperature, the high pressure, the low pressure, the inverter current value, the inverter rotational speed, and the electromagnetic valve opening degree of the outdoor unit.

The outside air temperature may be, for example, the outside air temperature measured by the thermistor 215. The intake tube temperature is, for example, the temperature of the refrigerant taken into the compressor 201 measured by the thermistor 226. The discharge tube temperature is, for example, the temperature of the refrigerant discharged from the compressor 201 measured by the thermistor 216.

The heat exchange temperature may be, for example, the liquid tube temperature of the outdoor heat exchanger 202 measured by the thermistor 218. The supercooling heat exchange outlet temperature may be, for example, at least one of the liquid tube temperature of the supercooling heat exchanger 213 measured by the thermistor 219 and the evaporation-side gas tube temperature of the supercooling heat exchanger 213 measured by the thermistor 220.

The receiver fluid tube temperature may be, for example, the fluid tube temperature measured by a sensor (thermistor) that detects the fluid tube temperature at the inlet of the receiver when the outdoor unit 2000 has a receiver (refrigerant quantity adjustment container) instead of or in addition to the accumulator 225. The accumulator inlet temperature may be the gas tube temperature at the inlet of the accumulator 225 as measured by the thermistor 217.

The high pressure may be, for example, the high pressure measured by the high pressure sensor 209. The low pressure may be, for example, the low pressure measured by the low pressure sensor 210. The inverter current value is, for example, the current value supplied to the inverter that changes the rotational speed of the motor of the compressor 201. The inverter rotational speed may be, for example, the number of revolutions per unit time (rotational speed) of the motor of the compressor 201. The electromagnetic valve opening of the outdoor unit is, for example, the opening of the electromagnetic valve 205, the electromagnetic valve 206, the electromagnetic valve 207, etc.

Here, the determining unit 42 may determine whether to generate the learned model based on at least one of the measurement values measured by each of the sensors of the device 20, the anomaly diagnosis result of the device 20, the result of the control on the device 20, and the conditions relating to the device 20.

(Example of Condition-Based Determination Relating to the Device 20)

The determining unit 42 may determine the environment in which the device 20 is used based on the measurement values measured by each of the sensors of the device 20, and when the environment satisfies a predetermined condition, the determining unit 42 may determine that a learned model is to be generated. In this case, the determining unit 42 may determine that the learned model is to be generated if, for example, the transition of the outside air temperature measured by the thermistor 215 satisfies a predetermined condition. This can reduce the decrease in the accuracy of anomaly diagnosis caused by the use of a default inference model when, for example, the device 20 is installed in an extremely cold area or a subtropical location.

The determining unit 42 may determine that the learned model is to be generated when the information on the property where the device 20 is installed satisfies a predetermined condition. The information on the property where the device 20 is installed may be set in the device 20 by a worker, etc., when the device 20 is installed on the property, for example. This can reduce the decrease in the accuracy of anomaly diagnosis caused by the use of a default inference model when, for example, the device 20 is installed in an extremely cold area or a subtropical location.

The determining unit 42 may also determine that the learned model is to be generated when the machine type of the device 20 satisfies a predetermined condition. This can reduce the decrease in the accuracy of anomaly diagnosis caused by the use of a default inference model when, for example, when the device 20 is a machine type with low air-conditioning capacity, and the device 20 is installed in an extremely cold area or a subtropical location, the property has extremely high or low insulation performance, or the property is a store with a large number of visitors, etc.

(Example of Determination Based on at Least One of Measurement Value Measured by Each of the Sensors of the Device 20, Anomaly Diagnosis Result by the Device 20, and Control Result Relating to the Device 20)

In the processing of step S1, the determining unit 42 may first cause the inference unit 43 to estimate the value relating to the component of the device 20 by a predetermined estimation method based on at least one of the measurement values measured by each of the sensors of the device 20, the anomaly diagnosis result of the device 20, and the control result for the device 20. The predetermined estimation method may be, for example, an estimation method for each machine type of the device 20 that is set in advance at the time of factory shipment of the device 20. The predetermined estimation method may be, for example, a method using AI (Artificial Intelligence) that estimates values relating to components of the device 20 in an average usage environment of the device 20.

Measurement values measured by each of the sensors of the device 20 may include, for example, a history of values relating to the components of the device 20 described above. In this case, the determining unit 42 may determine that the learned model is to be generated if the error (degree of divergence) between the value estimated by the inference unit 43 according to a predetermined estimation method and the measurement value of the value relating to the components of the device 20 is greater than or equal to a threshold.

The anomaly diagnosis results of the device 20 may include a set of information, including a history of measurement values measured made by each of the sensors of the device 20 and information indicating the results of the anomaly diagnosis set by the maintenance personnel (field engineer), etc. In this case, the determining unit 42 may determine that a learned model is to be generated if, for example, the degree of divergence between the anomaly determination result obtained by the anomaly determining unit 45 based on the value estimated by the inference unit 43 according to the predetermined estimation method and the actual measurement value measured by each of the sensors of the device 20, and the anomaly diagnosis result set by the maintenance personnel, etc., is greater than or equal to a threshold.

The control result for the device 20 may include a control signal (an instruction) from the control device 40 to each unit of the device 20, the operation mode and set temperature set by the user by a remote control, etc., and a history of measurement values measured by each of the sensors of the device 20. In this case, the determining unit 42 may determine that the learned model is to be generated if, for example, the error (degree of divergence) between the actual measurement value of the feedback value for the control signal and the feedback value estimated by the inference unit 43 by the predetermined estimation method is greater than or equal to a threshold.

When it is determined that the learned model is to be generated (YES in step S1), the generating unit 44 generates the learned model unique to the device 20 by machine learning (step S2).

Here, the generating unit 44 may generate the learned model based on the learning data acquired when the components of the device 20 are normal.

In this case, the generating unit 44 may use the data acquired by the acquiring unit 41 within a predetermined period (for example, within two years) from the date and time when the device 20 is installed as learning data acquired when the components of the device 20 are normal. Thus, appropriate learning can be performed, even in a case where, for example, the failure rate of the components of the device 20 follows the bathtub curve (failure rate curve), and after a certain period of time passes to enter a wear failure period, the failure rate rapidly increases due to aging deterioration, etc.

In this case, the generating unit 44 may record, for example, the date and time when the device 20 is first started by the user as the date and time when the device 20 is installed. Also, the date and time when the device 20 is installed may be set by a worker or the like.

The generating unit 44 may use, as the learning data, a data set in which at least one of the measurement values measured by each of the sensors of the device 20, the anomaly diagnosis result of the device 20, and the control result for the device 20 is used as an explanatory variable, and the measurement value of the value relating to the component is used as the correct answer label. The generating unit 44 may perform machine learning by, for example, neural network, support vector machine (SVM), logistic regression, random forest, k-nearest neighbors, etc.

Then, the anomaly determining unit 45 determines (diagnoses) the anomaly of the components, etc., of the device 20 based on the measurement values measured by each of the sensors of the device 20 (step S3).

First, the anomaly determining unit 45 causes the inference unit 43 to calculate (inference, estimate) the value relating to the components included in the device 20. Here, when the learned model is generated by the generating unit 44, the anomaly determining unit 45 causes the inference unit 43 to calculate (inference, estimate) the value relating to the components included in the device 20 by using the learned model. On the other hand, when the learned model is not generated, the anomaly determining unit 45 causes the inference unit 43 to calculate the value relating to the components included in the device 20 by using the predetermined estimation method described above.

Then, when the error between the values relating to the components included in the device 20 calculated by the inference unit 43 and the actual measurement values of the values relating to the components measured by each of the sensors of the device 20 is greater than or equal to a threshold, the anomaly determining unit 45 may determine that the components have an anomaly.

(Example of Determining Inference Model)

The determining unit 42 may determine which of the default inference model and the learned model unique to the device 20 generated by the generating unit 44 is to be used in order to cause the anomaly determining unit 45 to perform the anomaly determination. Thus, when, for example, the accuracy of the estimation by the learned model is insufficient due to lack of learning data, the anomaly determination using a default inference model can be performed.

In this case, the determining unit 42 may calculate the first error between the first estimation value of the value relating to the component of the device 20 estimated by the inference unit 43 by using the predetermined estimation method and the actual measurement value of the value relating to the component. Then, the determining unit 42 may calculate the second error between the second estimation value of the value relating to the component estimated by the learned model by the inference unit 43 and the actual measurement value of the value relating to the component.

Then, on the basis of the first estimation value and the second estimation value, the determining unit 42 may determine which inference model among the predetermined estimation method and the estimation method using the learned model is to be used to cause the anomaly determining unit 45 to perform the anomaly determination. Then, the anomaly determining unit 45 may cause the inference unit 43 to perform the inference by using the inference model determined by the determining unit 42.

(Example of Slackening Anomaly Determination Until Learned Model is Generated)

When it is determined by the determining unit 42 in the processing of step S1 that the anomaly determining unit 45 generates a learned model for estimating the value relating to the component included in the device 20, for example, the anomaly determination unit may slacken the anomaly determination for the device 20 until the learned model is generated. Thus, erroneous anomaly determination can be reduced by inference using a default inference model that is determined to have low accuracy of anomaly determination.

In this case, when it is determined by the determining unit 42 that a learned model is not to be generated (NO in step S1), and when the error between the estimation value and the measurement value of the value relating to the component of the device 20 is greater than or equal to the first threshold, the anomaly determining unit 45 may determine that the component has an anomaly. On the other hand, when the error is not greater than or equal to the first threshold, the anomaly determining unit 45 may determine that the component does not have an anomaly.

When the determining unit 42 determines that a learned model is to be generated (YES in step S1), the anomaly determining unit 45 may determine that the component has an anomaly when the error between the estimation value and the measurement value of the value relating to the component of the device 20 is greater than or equal to the second threshold, which is greater than the first threshold. On the other hand, when the error is not greater than or equal to the second threshold, the anomaly determining unit 45 may determine that the component does not have an anomaly.

Subsequently, the anomaly determining unit 45 outputs the anomaly determination result of the device 20 (step S4). Here, the anomaly determining unit 45 may display the anomaly determination result on the display unit of the remote control or the like of the device 20. The anomaly determining unit 45 may also notify the anomaly determination result to an external device such as the information processing apparatus 10A.

Modified Example

In the above described embodiment, an example of generating a learned model (machine learning) and performing inference at the device 20 has been described. Alternatively, a configuration in which the generation and inference of a learned model are each performed by either the information processing apparatus 10A or the information processing apparatus 10B, respectively, may be adopted.

Each functional unit of the control device 40 of the device 20, the information processing apparatus 10A, and the information processing apparatus 10B may be implemented by cloud computing provided by, for example, one or more computers.

The embodiments are described as above, but it will be understood that various changes in form and details are possible without departing from the purport and scope of the claims.

Finally, the present international application claims priority based on Japanese Patent Application No. 2020-158989 filed on Sep. 23, 2020, and the entire contents of the Japanese Patent Application are hereby incorporated by reference.

REFERENCE SIGNS LIST 1 information processing system
10 information processing apparatus
20 device
40 control device
41 acquiring unit
42 determining unit
43 inference unit
44 generating unit
45 anomaly determining unit
46 control unit
2000 outdoor unit
201 compressor
202 outdoor heat exchanger
203 electronic expansion valve
204 electronic expansion valve
205 electromagnetic valve
206 electromagnetic valve
207 electromagnetic valve
208 four-way switching valve
209 high pressure sensor
210 low-pressure sensor
211 high-pressure switch
212 pressure adjustment valve
213 supercooling heat exchanger
214 capillary tube
215 thermistor
216 thermistor
217 thermistor
218 thermistor
219 thermistor
220 thermistor
221 thermistor
222 thermistor
223 refrigerant cooling plate
224 oil separator
225 accumulator
226 thermistor
2500 indoor unit
251 electronic expansion valve
252 thermistor
253 thermistor
254 thermistor
255 thermistor
256 indoor heat exchanger

The invention claimed is:

1. An information processing apparatus comprising:
a determining unit configured to determine whether to generate a learned model, unique to a device, that estimates a value relating to a component included in the device, based on an error between an actual measurement value of at least one of a measurement value measured by each sensor of the device, an anomaly diagnosis result of the device, or a result of controlling the device, and an estimation value of a default inference model.

2. The information processing apparatus according to claim 1, further comprising:
an estimating unit configured to estimate the value relating to the component by the default inference model, based on at least one of the measurement value measured by each sensor of the device, the anomaly diagnosis result of the device, or the result of controlling the device, wherein
the determining unit determines to generate the learned model, when an error between the value estimated by the estimating unit and the actual measurement value of the value relating to the component is greater than or equal to a threshold.

3. The information processing apparatus according to claim 1, wherein
the determining unit determines to generate the learned model, when at least one of an environment in which the device is used determined based on the measurement value measured by each sensor of the device, information of a property where the device is installed, or a machine type of the device, satisfies a predetermined condition.

4. The information processing apparatus according to claim 1, further comprising:
an anomaly determining unit configured to
determine that the component has an anomaly, when the determining unit determines not to generate the learned model and the error between the estimation value and the actual measurement value of the value relating to the component is greater than or equal to a first threshold, and
determine that the component has an anomaly, when the determining unit determines to generate the learned model and the error between the estimation value and the actual measurement value of the value relating to the component is greater than or equal to a second threshold that is greater than the first threshold.

5. The information processing apparatus according to claim 1, further comprising:
a generating unit configured to generate the learned model based on a data set when the component is normal, in which at least one of the measurement value measured by each sensor of the device, the anomaly diagnosis result of the device, or the result of controlling the device is an explanatory variable, and the actual measurement value of the value relating the component is a correct answer label.

6. The information processing apparatus according to claim 1, wherein the determining unit determines an estimation method of estimating the value relating to the component for detecting an anomaly of the component, from among an estimation method using the default inference model and an estimation method using the learned model, based on a first error between a first estimation value of the value relating to the component estimated by the default inference model and the actual measurement value, and a second error between a second estimation value of the value relating to the component estimated by the learned model and the actual measurement value.

7. The information processing apparatus according to claim 1, wherein the value relating to the component includes at least one of an outside air temperature, an intake tube temperature, a discharge tube temperature, a heat exchange temperature, a supercooling heat exchange outlet temperature, a receiver liquid tube temperature, an accumulator inlet temperature, a high pressure, a low pressure, an inverter current value, an inverter rotational speed, or an electromagnetic valve opening degree of an outdoor motor.

8. An information processing method in which an information processing apparatus executes a process of determining whether to generate a learned model, unique to a device, that estimates a value relating to a component included in the device, based on an error between an actual measurement value of at least one of a measurement value measured by each sensor of the device, an anomaly diagnosis result of the device, or a result of controlling the device, and an estimation value of a default inference model.

9. A non-transitory computer readable medium program containing computer instructions stored therein for causing a computer processor to perform a process of determining whether to generate a learned model, unique to a device, that estimates a value relating to a component included in the device, based on an error between an actual measurement value of at least one of a measurement value measured by each sensor of the device, an anomaly diagnosis result of the device, or a result of controlling the device, and an estimation value of a default inference model.

* * * * *